June 28, 1955
L. G. TIMEUS
2,711,714
AQUARIUM FEEDING DEVICE
Filed April 29, 1954
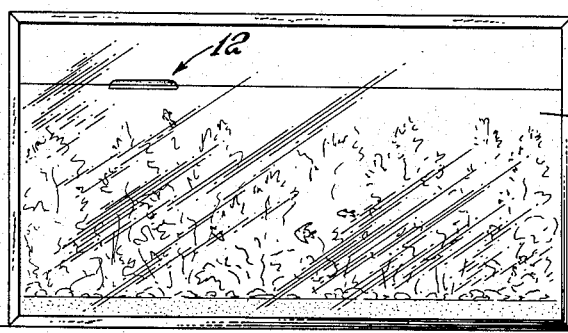
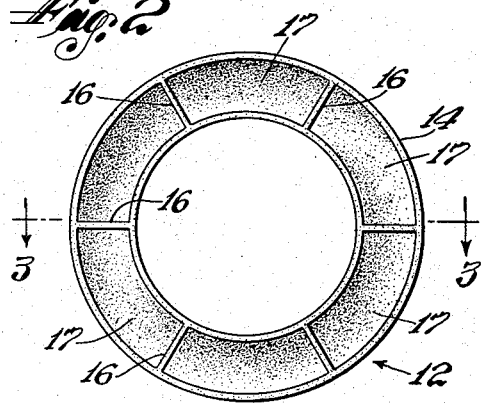
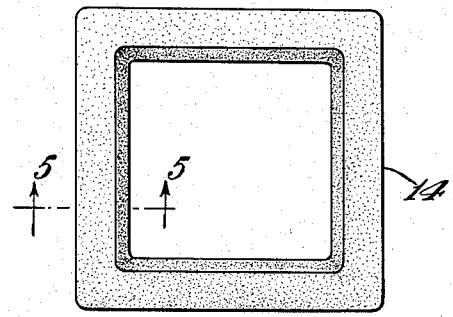
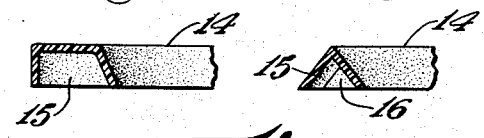
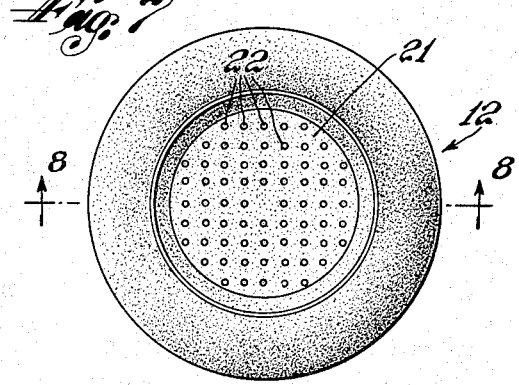
INVENTOR.
Lawrence G. Timeus
BY
ATTORNEY

United States Patent Office 2,711,714
Patented June 28, 1955

2,711,714

AQUARIUM FEEDING DEVICE

Lawrence G. Timeus, New York, N. Y.

Application April 29, 1954, Serial No. 426,372

3 Claims. (Cl. 119—5)

This invention relates to fish feeding apparatus, and, more particularly, to such apparatus for use in the feeding of small fish such as are often raised in the home as a hobby.

Heretofore, it has been customary to sprinkle dry or other forms of food, such as live tubifex or white worms, on the surface of the aquarium water. Often the food would then become enmeshed in the plant life or other aquarium accessories present, or, in the case of the dry food, would contact and stick to the sides of the aquarium. The food then, instead of being eaten, would decay and contaminate and pollute the water rendering it unhealthy for the fish as well as unsightly and malodorous thereby necessitating frequent water changes.

It has been proposed to provide feeders of a type including a trough located well below the surface of the water for containing the food, and a tube extending from the trough to the surface of the water for delivering food to the trough. Such feeders provide inherent disadvantages in that dry food often floats on the surface of the water inside the tube and remains inaccessible to the fish; or it sticks to the inside wall of the tube and decays therein. Then too, such a feeder cannot properly be used for feeding live worms to the fish since the worms could swim about in the tube, and eventually drown and decay thereby contaminating the water; or upon reaching the trough, they could swim away from the feeder, wherefore the trough would serve no useful purpose.

Accordingly, an object of the present invention is to provide a fish feeding device which is not subject to any of the foregoing difficulties and disadvantages.

Another object is to provide such a device which is relatively inexpensive and can be afforded by anyone owning a household aquarium.

Another object is to provide such a device which does not have any parts requiring replacement or repair as a result of normal use.

Another object is to provide such a device which floats on the surface of the water and which can withstand a limited amount of damage without sinking.

A further object is to provide such a device from which unused food can be readily removed before it has a chance to decay.

A still further object is to provide such a device which may be used for the feeding of dry food or live worms.

Other and further objects of the invention will be obvious upon an understanding of the illustrative embodiment about to be described, or will be indicated in the appended claims, and various advantages not referred to herein will occur to one skilled in the art upon employment of the invention in practice.

In accordance with the invention, the foregoing objects and their attendant advantages are attained by providing a feeding device for use in connection with aquariums comprising a frame member having a semi-tubular cross-section providing recess means on the underside thereof, this member being constructed of buoyant material or being dimensioned to render the same buoyant. In the illustrative embodiment about to be described, the frame member may be employed alone or a perforated dish member may be supported within the frame opening, depending upon the particular type of food being used.

A preferred embodiment of the invention has been chosen for purposes of illustration and description, and is shown in the accompanying drawing, forming a part of the specification, wherein:

Fig. 1 is an elevation view, drawn to a reduced scale, of a household aquarium showing the frame member as it is used to feed dry food;

Fig. 2 is a bottom view of the frame member;

Fig. 3 is a cross-sectional view taken along the lines 3—3 of Fig. 2;

Fig. 4 is a plan view of a frame member having a different configuration;

Fig. 5 is a cross-sectional view taken along the lines 5—5 of Fig. 4;

Fig. 6 illustrates an alternative cross-sectional contour of the frame member;

Fig. 7 is a plan view of the dish member; and

Fig. 8 is a cross-sectional view of the dish member supported within the opening of the frame member shown in Figs. 2 and 3.

Referring to the drawing, and more particularly to Fig. 1 thereof, there is shown an aquarium 10 containing a quantity of water 11 and the feeder frame member 12 afloat upon the surface of the water.

As shown in Figs. 2 and 3, the frame member 12 comprises an annular ring 14 which is semi-circular in cross-section, thereby providing an annular recess 15 on the underside thereof. A plurality of partition means or ribs 16 are radially disposed in the recess to divide the same into a plurality of individual cells 17. By way of example, the member illustrated is divided into six individual cells by six ribs spaced sixty degrees apart. The frame member 14 may be rectangular in shape as illustrated in Fig. 4 or it may be formed in any desired closed geometrical figure; and its cross-section may be such as to provide a three or a two sided recess as shown in Figs. 5 and 6. The ribs 16 will, of course, vary in shape according to the particular shape of recess employed, so that, in each case the recess is divided into a plurality of individual cells preferably at least three in number.

The dish member 19, as shown in Fig. 7, may be employed in conjunction with the frame member, in a manner and for a purpose to be discussed.

The dish member is formed with an upwardly and outwardly tapering side wall 20, a flat bottom portion 21 and a plurality of perforations 22 in the bottom portion large enough for the worms to fit through axially. The upper rim of the dish member side wall is of a greater diameter than the interior rim of the frame member, while the lower rim of the side wall is of a smaller diameter than that of the frame member inner rim for a purpose to be described hereinafter.

In use, the frame member may be employed alone or in conjunction with the dish member depending upon whether or not dry food or worms are to be fed.

When it is desired to feed dry food the frame member 14 is floated upon the surface of the water as shown in Fig. 1 and the food is placed upon the water enclosed by the frame member. The individual cells 17 in the recess each confine a quantity of air so that if air is caused to leak or otherwise escape from one or two cells as a result of damage or tilting of the frame member by the fish, for example, the buoyancy of the frame member will not be materially affected and it will remain afloat. It had been contemplated to construct the frame member of an annular tube, however, it is obvious that such a construction requires a seam in the material to confine a volume of air therein. Such a seam is difficult to make airtight and a small opening in the seam or in even the most limited zone of the frame member due to a small injury at that point would permit water to displace the air therein and allow the member to sink thus rendering it useless. The frame member described herein is designed to obviate such seams and their attendant disadvantages and will not sink as a result of localized injury permitting water to enter one or two cells.

If it is desired to feed worms, the dish member 19 is inserted into the frame member opening, as shown in Fig. 8 so that the side wall 20 depends slightly below the frame member and the bottom 21 of the dish member is below the surface of the water. The dish member is thus supported by the frame member. The worms are placed in the dish and, from time to time, will find their way out through the perforations 22 and into the water where they will be available to the fish.

Since it is necessary for the frame member to float upon the surface of the water and to support the dish member as well, it will be understood that the members must be constructed of a buoyant material or be dimensioned to render them buoyant. It is preferred that the volume of the recess 15 be greater than the volume of both the frame and dish members so as to enhance the buoyancy thereof. It is also desirable to construct the members of a material such as plastic moulding compound which is not subject to deterioration or decomposition resulting from contact with water and/or air and to construct the walls of the members relatively thin, since they are not normally subjected to rough usage. It will also be understood that, since the frame member must support the dish member, it is preferred that the surface of the frame member be shaped and dimensioned so as to engage the upper portion of the side wall 20 of the dish member to support the same in the frame opening; although it is appreciated that other conventional means such as opposed flanges or hook means could be used to support a dish member having a straight side wall, for example.

From the foregoing description, it will be seen that the present invention provides an inexpensive aquarium feeding device having no parts requiring replacement or repair as a result of normal use which can readily be adapted for the feeding of dry food or live worms. It will also be seen that the present invention retains the food within a limited zone and will float on the surface of the water even with limited damage to its air confining cells.

As various changes may be made without departing from the spirit and scope of the invention and without sacrificing any of its advantages, it is to be understood that all matter herein is to be interpreted as illustrative and not in any limiting sense.

I claim:

1. A feeding device for use in connection with aquariums comprising a frame member having a semi-tubular cross-section providing recess means on the underside thereof, and a dish member having a perforated bottom portion supported within the opening of said frame member, said members being constructed so as to render the same buoyant.

2. A feeding device according to claim 1, wherein the dish member is formed with an upwardly and outwardly tapering side wall and the frame member is constructed to engage the upper portion of said side wall to support said dish member in the frame opening.

3. A feeding device for use in connection with aquariums comprising a frame member having a semi-tubular cross-section providing recess means on the underside thereof, and a dish member formed with an upwardly and outwardly tapering side wall and with a perforated bottom portion, said frame member being constructed to engage the upper portion of said side wall to support said dish member in the frame opening, the lower portion of said side wall depending from the frame opening, said members being constructed to render the same buoyant.

References Cited in the file of this patent
UNITED STATES PATENTS

| 631,798 | Learned | Aug. 29, 1899 |
| 1,885,342 | Graves | Nov. 1, 1932 |
| 1,976,962 | Pape | Oct. 16, 1934 |

FOREIGN PATENTS

| 143,395 | Germany | Aug. 15, 1903 |